US009511693B2

(12) United States Patent
Nakagawa et al.

(10) Patent No.: US 9,511,693 B2
(45) Date of Patent: Dec. 6, 2016

(54) VEHICLE SEAT

(71) Applicants: TOYOTA BOSHOKU KABUSHIKI KAISHA, Aichi-ken (JP); SHIROKI CORPORATION, Kanagawa (JP)

(72) Inventors: Tetsuo Nakagawa, Aichi-Ken (JP); Hiroyuki Mita, Aichi-ken (JP)

(73) Assignees: TOYOTA BOSHOKU KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/692,053

(22) Filed: Apr. 21, 2015

(65) Prior Publication Data
US 2015/0306990 A1 Oct. 29, 2015

(30) Foreign Application Priority Data

Apr. 25, 2014 (JP) .................................. 2014-091084

(51) Int. Cl.
| B60N 2/44 | (2006.01) |
| B60N 2/22 | (2006.01) |
| B60N 2/60 | (2006.01) |
| B60N 2/68 | (2006.01) |
| B60N 2/235 | (2006.01) |

(52) U.S. Cl.
CPC ................ B60N 2/442 (2013.01); B60N 2/22 (2013.01); B60N 2/2356 (2013.01); B60N 2/6009 (2013.01); B60N 2/682 (2013.01); B60N 2205/50 (2013.01)

(58) Field of Classification Search
CPC ......... B60N 2/442; B60N 2/22; B60N 2/6009; B60N 2/682; B60N 2/2356; B60N 2205/50; B60N 2/0296
See application file for complete search history.

(56) References Cited

U.S. PATENT DOCUMENTS

| 7,938,490 | B2* | 5/2011 | Ishijima | B60N 2/0296 297/344.1 |
| 8,162,404 | B2* | 4/2012 | Ueda | B60N 2/0296 297/344.12 |
| 2012/0175931 | A1* | 7/2012 | Matsui | B60N 2/2356 297/354.12 |
| 2013/0187424 | A1* | 7/2013 | Pleskot | B60N 2/06 297/311 |

FOREIGN PATENT DOCUMENTS

JP          2008-168124          7/2008

* cited by examiner

*Primary Examiner* — Philip Gabler
(74) *Attorney, Agent, or Firm* — Greenblum & Bernstein, P.L.C.

(57) ABSTRACT

There is disclosed a vehicle seat having an operating member to operate an operating seat mechanism disposed in the seat, and a pivoting operation lever coupled to the operating member to exert a pivoting operation force, thereby operating the operating seat mechanism, the operating member is integrally constituted of a shaft portion and an arm portion, the pivoting operation lever has a holding region and a coupling region to transmit the pivoting operation force to the operating member, and the coupling region has a fitting portion which fits on the shaft portion from an axial direction, and an output surface portion which comes in contact with the arm portion in a pivoting direction of the arm portion.

8 Claims, 5 Drawing Sheets

VEHICLE SEAT

INCORPORATION BY REFERENCE

The disclosure of Japanese Patent Application No. 2014-091084 filed on Apr. 25, 2014 including the specification, drawings and abstract is incorporated herein by reference in its entirety.

BACKGROUND OF THE INVENTION

1. Field of the Invention

The invention relates to a vehicle seat.

2. Description of Related Art

Heretofore, there has been known a vehicle seat having an operating member to operate an operating seat mechanism disposed in a seat, and a pivoting operation lever coupled to the operating member to exert a pivoting operation force, thereby operating the operating seat mechanism (e.g., Japanese Patent Application Publication No. 2008-168124 (JP 2008-168124 A)). In JP 2008-168124 A, as an example of the operating seat mechanism, a reclining mechanism of the vehicle seat is disclosed. In such a reclining mechanism, a shaft portion to operate the reclining mechanism and a pivoting operation lever coupled to this shaft portion are disclosed. Here, the pivoting operation lever is directly inserted and fixed in the shaft portion.

However, the pivoting operation force of the pivoting operation lever in the above structure is concentrated on a region into which the shaft portion is inserted, and hence there has been the possibility that a length of the lever cannot be increased so as to inhibit deformation or the like of such a region. When the lever cannot be lengthened, it is necessary to exert a large pivoting operation force. When an attaching area to the shaft portion would be enlarged by, for example, enlarging a shaft diameter of the shaft portion to lengthen the lever, there is a possibility for increase of a weight due to the enlarged diameter of the shaft portion.

SUMMARY OF THE INVENTION

According to the invention, there is provided a vehicle seat having a structure in which concentration of a pivoting operation force on an operating member is restricted when a pivoting operation lever is coupled to the operating member.

First, according to an aspect of the invention, a vehicle seat has an operating member to operate an operating seat mechanism disposed in the seat, and a pivoting operation lever coupled to the operating member to exert a pivoting operation force, thereby operating the operating seat mechanism, and the operating member is integrally constituted of a shaft portion which pivots around an axis to operate the operating seat mechanism, and an arm portion which extends from a rotation center of the shaft portion outwardly in a radial direction. The pivoting operation lever has a holding region disposed outwardly from the rotation center of the operating member in the radial direction to exert the pivoting operation force on the operating member, and a coupling region to transmit the pivoting operation force to the operating member, and the coupling region has a fitting portion which fits on the shaft portion from an axial direction, and an output surface portion which comes in contact with the arm portion in a pivoting direction of the arm portion.

According to this aspect, the pivoting operation force exerted by the holding region of the pivoting operation lever is transmitted to an operating member via two paths of a transmission path from the fitting portion to the shaft portion and a transmission path from the output surface portion to the arm portion, and hence the pivoting operation force can be distributed. Therefore, it is possible to employ a structure in which the pivoting operation force is distributed without changing a shape of the shaft portion.

According to the above aspect, the pivoting operation lever and the operation member may be engaged with each other in the axial direction by an engaging structure provided between the arm portion and the coupling region.

According to this constitution, the engaging structure engages the pivoting operation lever with the operation member in the axial direction, and hence movement of the pivoting operation lever in the axial direction can be regulated and attaching can stably be performed.

In the above aspect, the arm portion may have an input surface portion which comes in contact with the output surface portion, and the input surface portion may be interposed between the fitting portion and the holding region of the pivoting operation lever.

According to this constitution, the arm portion has the input surface portion which comes in contact with the output surface portion. This input surface portion is interposed between the fitting portion and the holding region of the pivoting operation lever, and hence the pivoting operation lever does not have to be enlarged more than necessary but can be made compact.

In the above aspect, the pivoting operation lever may have a cap which is detachably attached from an outside of the pivoting operation lever in the axial direction, and the engaging structure may be interposed between the cap and the arm portion.

According to this constitution, the pivoting operation lever has the cap detachably attached from the outside of the pivoting operation lever in the axial direction. In addition, the engaging structure is interposed between the cap and the arm portion. In consequence, an operability in attaching and detaching the pivoting operation lever can improve.

In the present aspect, according to the above constitution, there can be provided the vehicle seat having a structure in which the pivoting operation force is distributed when the pivoting operation lever is coupled to the operating member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an example embodiment of the present invention will be described with reference to FIGS. 1 to 5. The present embodiment illustrates a vehicle seat (e.g., a seat for an automobile), and a reclining mechanism 6 disposed in such a vehicle seat and a reclining lever 30 which operates the reclining mechanism will be illustrated and described. It is to be noted that directions suitably shown by arrows in respective drawings correspond to front, rear, up, and down, directions of a vehicle, and inner side and outer side of the vehicle width direction, respectively. It is to be noted that the respective drawings mainly show peripheries of the reclining mechanism 6 and the reclining lever 30, and drawings and descriptions of the other internal structures and accessories are omitted sometimes.

Figure 1:
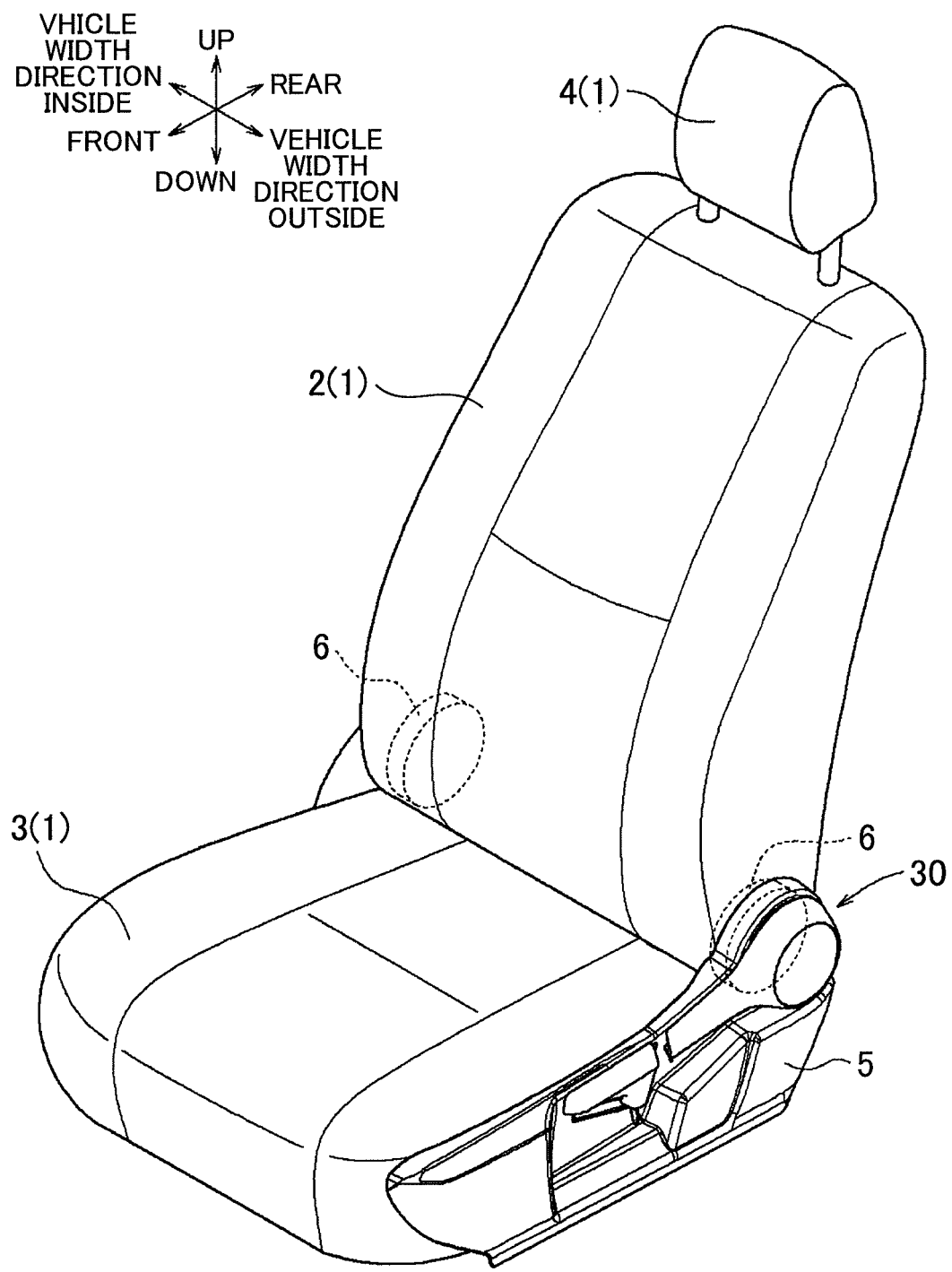
FIG. 1 is a general perspective view of a vehicle seat according to an embodiment.
Figure 2:
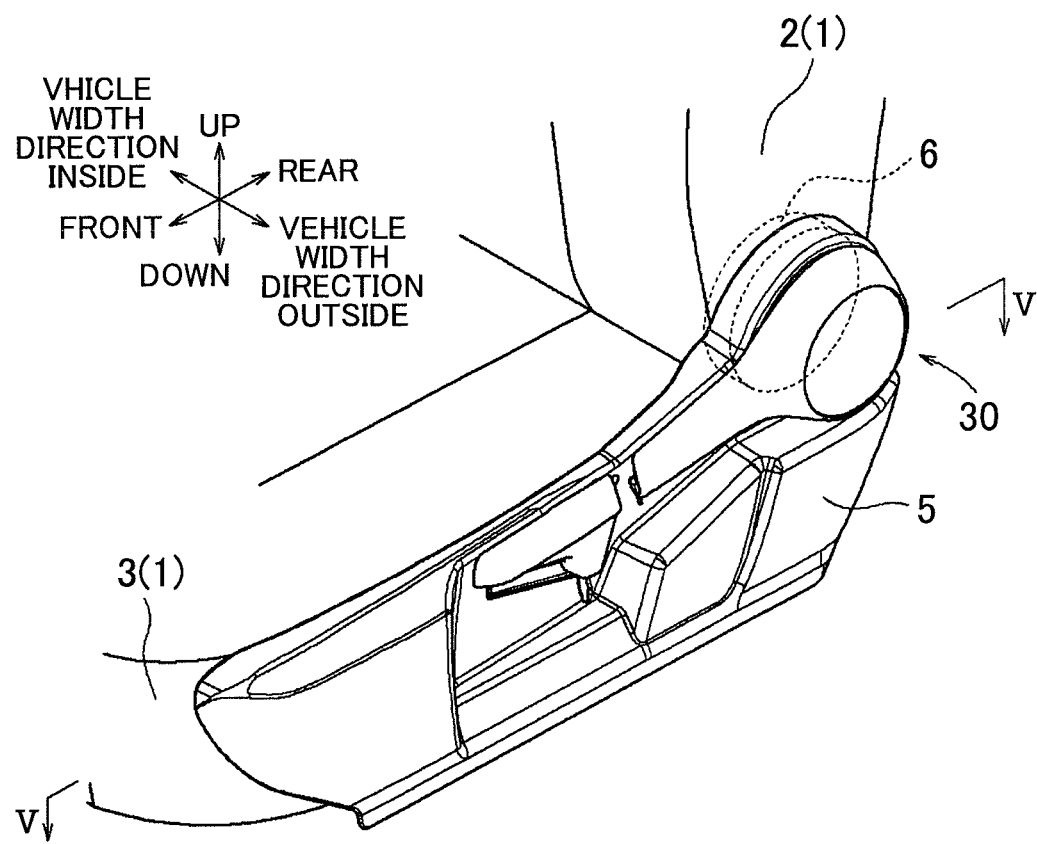
FIG. 2 is an enlarged perspective view of an enlarged reclining mechanism of the vehicle seat according to the embodiment.

The vehicle seat is disposed as a front side seat of a vehicle as shown in FIGS. 1 and 2. In the vehicle seat, a seat main body 1 is mainly constituted of a seat back 2, a seat cushion 3, and a head rest 4. The seat main body 1 is coupled to the seat cushion 3 by reclining mechanisms 6, 6 disposed in a lower part of the seat back 2 on both sides thereof in a width direction.

The reclining mechanisms 6, 6 constitute a mechanism which performs regulation of a back rest angle of the seat back 2 to the seat cushion 3. That is, the reclining mechanisms 6, 6 are always brought into a locked state in which the back rest angle of the seat back 2 is fixed, and are held. In the respective reclining mechanisms 6, 6, when the reclining lever 30 disposed on a left side of the seat cushion 3 (an outer side shown in the drawing) is rotated and operated, a pivoting operation force is exerted to release the above locked state, so that the back rest angle of the seat back 2 can be regulated. The reclining mechanisms 6, 6 perform the regulation of the back rest angle of the seat back 2 to the seat cushion 3, so that the seat back can be inclined forward over the seat cushion 3. It is to be noted that the reclining mechanisms 6, 6 of the present embodiment correspond to one example of "an operating seat mechanism" of the present invention. In addition, the reclining lever 30 of the present embodiment is one example of "a pivoting operation lever" of the present invention.

Figure 3:
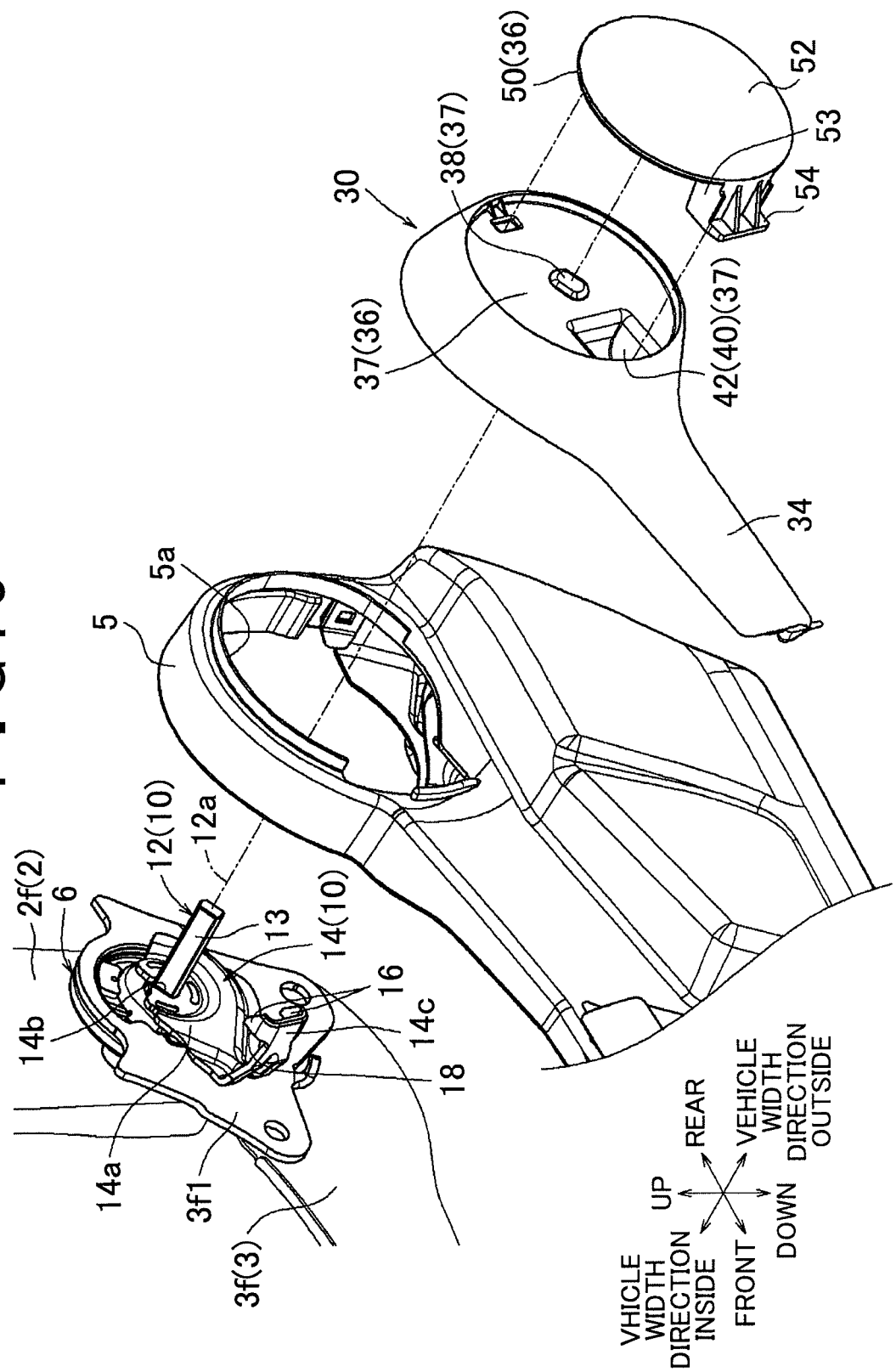
FIG. 3 is an exploded perspective view of the reclining mechanism viewed from an outside thereof.
Figure 4:
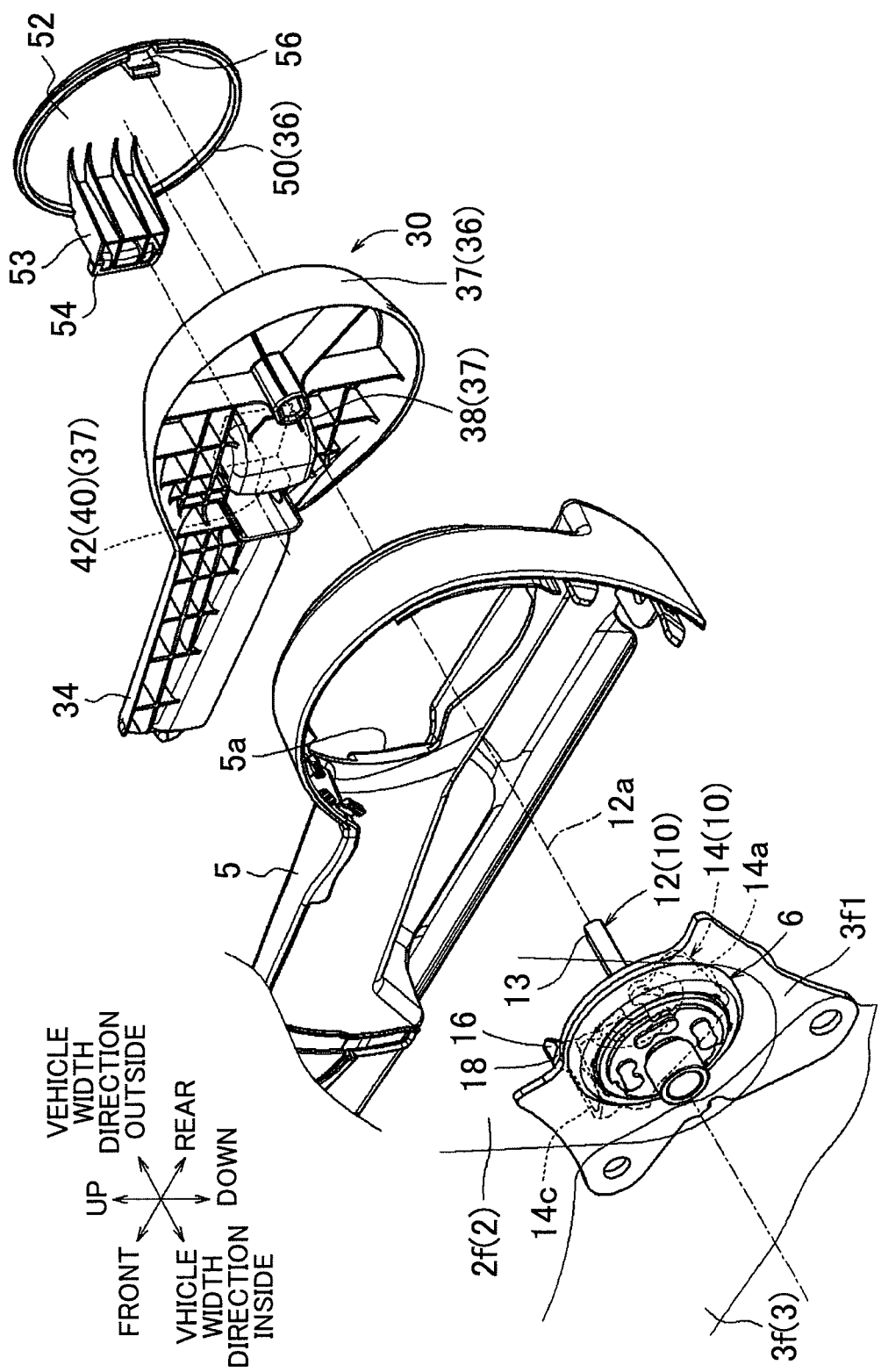
FIG. 4 is an exploded perspective view of the reclining mechanism viewed from an inside thereof.
Figure 5:
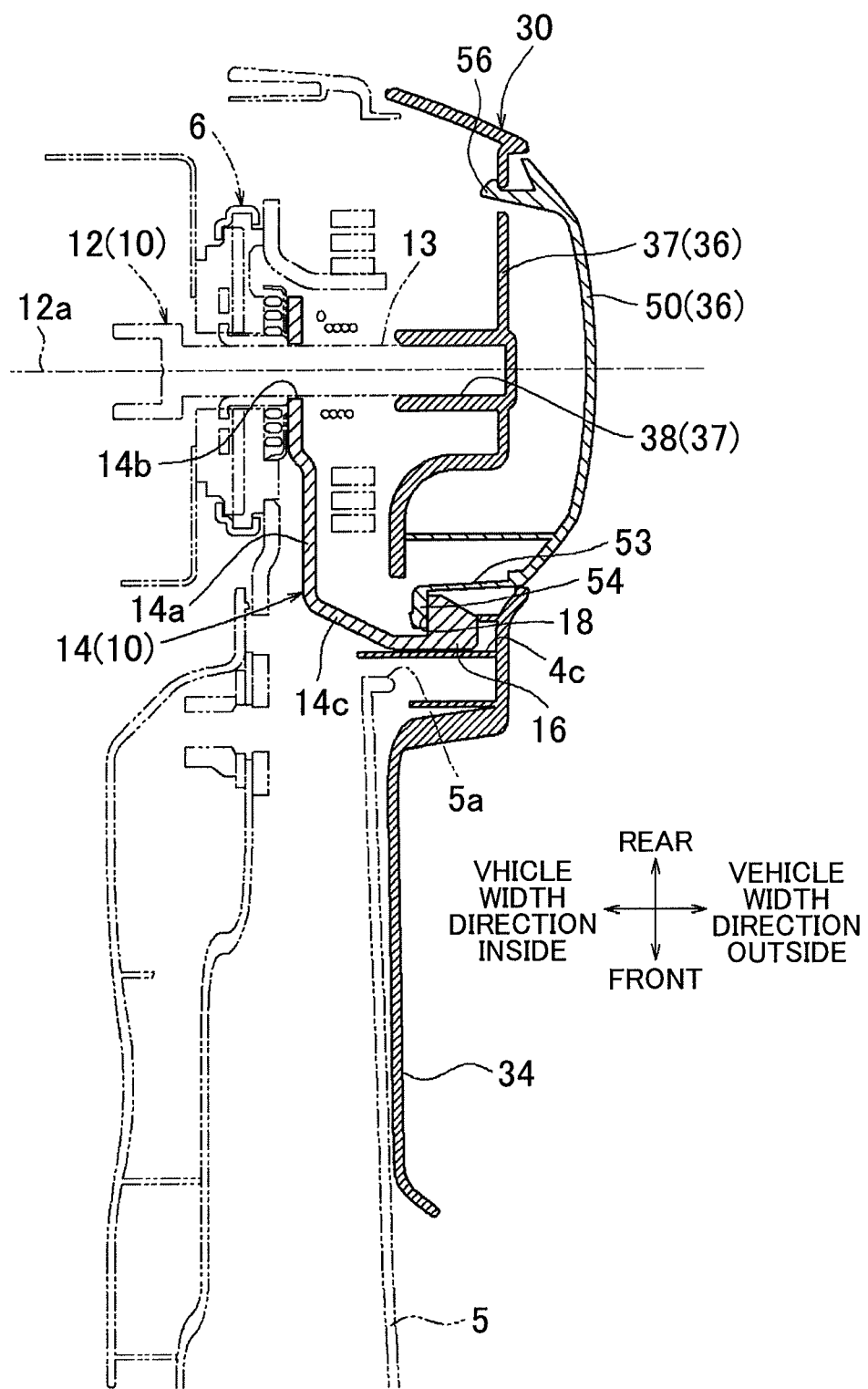
FIG. 5 is a sectional view taken along the V-V line of FIG. 2.

As shown in FIGS. 3 to 5, the outer reclining mechanism 6 is sandwiched by plate surfaces between a back frame 2f forming a framework of the seat back 2 and a lower arm 3f1 which is a part of a cushion frame 3f forming a framework of the seat cushion 3, to couple both the frames to each other. This also applies to the inner reclining mechanism 6. In the respective reclining mechanisms 6, 6, operating components of locking mechanisms are mutually coupled by unshown rod components, and changing to locking or lock releasing is performed synchronously on right and left (inner and outer) sides. In the outer reclining mechanism 6, a changing shaft 12 to change a lock operation state as described above is projected outwardly from the cushion frame 3f and inserted through the reclining mechanism in a plate thickness direction. The reclining lever 30 is coupled to the outer reclining mechanism 6 through an opening hole 5a made in a shield 5 disposed on a side surface of the seat cushion 3, and disposed along the shield 5. When the reclining lever 30 is pivoted and operated, the changing shaft 12 and an arm portion 14 projected from the outer reclining mechanism 6 are pivoted around an axis, to release the locked states of both the reclining mechanisms 6, 6 at once. Therefore, as to the seat back 2, when the reclining lever 30 is pivoted and operated, the locked states of the respective reclining mechanisms 6, 6 are released at once to adjust the back rest angle of the seat back 2 to the seat cushion 3.

A coupling constitution of the reclining mechanism 6 and the reclining lever 30 will be described. The vehicle seat has an operating member 10 to operate the reclining mechanisms 6, 6 disposed in the seat main body 1, and the reclining lever 30 coupled to the operating member 10 to exert the pivoting operation force, thereby operating the reclining mechanisms 6, 6. The operating member 10 is integrally constituted of the changing shaft 12 (a shaft portion) which pivots around the axis to operate the reclining mechanisms 6, 6 and the arm portion 14 which extends from a rotation center 12a of the changing shaft 12 outwardly in a radial direction. The changing shaft 12 of the present embodiment is one example of "the shaft portion" of the present invention.

The changing shaft 12 is constituted of a rod made of a metal, and has a cut surface 13 obtained by cutting a part of the rod as shown in a cross section viewed from an axial direction (cut at a position of a chord), so that the cross section of the changing shaft is formed into a non-circular shape. The arm portion 14 is constituted of a plate made of a metal, and has a plate-shaped fitting surface 14a which extends from the rotation center 12a of the changing shaft 12 outwardly in the radial direction. In a substantially central portion of the fitting surface 14a, a hole 14b of about the same shape as that of the cross section of the changing shaft 12 is opened and formed. In consequence, the changing shaft 12 is inserted into the hole 14b of the arm portion 14 and welded to the arm portion, so that the changing shaft and the arm portion are integrally constituted. It is to be noted that a method of integrally constituting the changing shaft 12 and the arm portion 14 is not limited to the welding. For example, the changing shaft 12 may be fixed by pressing the changing shaft 12 into the hole 14b, or the changing shaft 12 may be integrated with the arm portion 14 via a fixing member and the like. In a front edge portion of the fitting surface 14a of the arm portion 14, a flange portion 14c extended in parallel with the axial direction of the changing shaft 12 is formed. A distal end of the flange portion 14c has an input surface portion 16 which faces the changing shaft 12 (the operating member 10) in a pivoting direction of the changing shaft. The input surface portion 16 is a region into which the pivoting operation force of the reclining lever 30 is input from an output surface portion 42 of the aftermentioned reclining lever 30. In the input surface portion 16, the distal end of the flange portion 14c is folded to form a surface which comes in contact with the output surface portion 42 of the reclining lever 30. In addition, the input surface portion 16 is constituted of a pawl portion 18 (an engaging structure) shaped in the form of a hook which is engageable in the axial direction.

The reclining lever 30 (the pivoting operation lever) is made of a synthetic resin, and has a holding region 34 and a coupling region 36. The holding region 34 is a region disposed outwardly from the rotation center 12a of the operating member 10 in the radial direction to exert the pivoting operation force on the operating member 10. The coupling region 36 is a region to transmit the pivoting operation force to the operating member 10. In the reclining lever 30, the coupling region 36 is constituted of the engaging structure which engages with the arm portion 14 in the axial direction, so that the reclining lever 30 is coupled and fixed to the operating member 10 while movement of the reclining lever 30 in the axial direction is regulated. The coupling region 36 has a main body portion 37 and a cap 50.

The main body portion 37 is shaped in the form of a cup to cover the operating member 10 from an outside of the operating member in the axial direction, and is formed integrally with the holding region 34. The main body portion 37 has a fitting portion 38 and the output surface portion 42. The fitting portion 38 is opened and formed into about the same shape as that of the cross section of the changing shaft 12, and the changing shaft 12 is engageable with the fitting portion from the axial direction. The output surface portion 42 is a region which comes in surface contact with the arm portion 14 in the pivoting direction of the arm portion 14, thereby outputting (transmitting) the pivoting operation force. A through hole 40 extending through the main body portion in the axial direction is formed in a part of the main body portion 37 between the fitting portion 38 and the holding region 34. A side surface of the through hole 40 is formed as a surface which comes in surface contact with the input surface portion 16 of the arm portion 14. In consequence, the main body portion 37 of the coupling region 36 is constituted of the output surface portion 42. In other words, the input surface portion 16 of the arm portion 14 is interposed between the fitting portion 38 and the holding region 34 of the reclining lever 30 in a state where the reclining lever 30 is attached to the reclining mechanism 6.

The cap 50 which is one constitution of the coupling region 36 is constituted of the engaging structure which engages with the pawl portion 18 of the arm portion 14 from the axial direction. The cap 50 engages with the pawl portion 18 of the arm portion 14 from an outside of the main body portion 37 in the axial direction, so that the reclining lever 30 can detachably be attached. The cap 50 has a disc portion 52 which covers a region corresponding to the fitting portion 38 of the main body portion 37 from an outside of the region in the axial direction. An edge of the disc portion 52 is constituted of a projecting portion 53 extending inwardly from an edge of a position corresponding to the through hole 40 of the main body portion 37 in the axial direction to be inserted in the through hole 40. A distal end of the projecting portion 53 is constituted of an engaging pawl 54 (the engaging structure) which extends toward the pawl portion 18 of the arm portion 14 to engage with the pawl portion 18. Here, in the present embodiment, the engaging pawl 54 is shaped in the form of a hook similar to the pawl portion 18. A region of the edge of the disc portion 52 on a side opposite to the engaging pawl 54 in the radial direction is constituted of a locking portion 56 which locks on the main body portion 37. By the locking portion 56, the cap 50 is locked at a position on an outer side of the main body portion 37 in the axial direction. The engaging pawl 54 of the cap 50 engages with the pawl portion 18 of the arm portion 14 through the through hole 40 of the main body portion 37 in the axial direction, so that the reclining lever 30 is coupled and fixed to the operating member 10 in the axial direction. Therefore, the cap 50 can regulate the movement of the reclining lever 30 in the axial direction and stably hold an attached state. In addition, the cap 50 releases the locking of the locking portion 56 and the engagement of the engaging pawl 54 with the pawl portion 18, so that the reclining lever 30 can easily be detached. Consequently, in a space between the arm portion 14 and the coupling region 36, there is constituted the engaging structure with which the reclining lever 30 and the operating member 10 engage from the axial direction, and hence the reclining lever 30 can stably be attached to the reclining mechanism 6. It is to be noted that the pawl portion 18 and the engaging pawl 54 of the present embodiment correspond to one example of "the engaging structure" of the present invention.

In consequence, according to the vehicle seat of the present embodiment, the pivoting operation force by the holding region 34 of the reclining lever (the pivoting operation lever) is transmitted to the operating member 10 via two paths of a transmission path from the fitting portion 38 to the changing shaft 12 (the shaft portion) and a transmission path from the output surface portion 42 to the arm portion 14, and hence it is possible to obtain a structure in which the pivoting operation force is not concentrated. Therefore, it is possible to employ the structure in which the pivoting operation force is not concentrated (distributed), without changing the shape of the changing shaft 12.

In addition, there are constituted the pawl portion 18 and the engaging pawl 54 (the engaging structure) with which the reclining lever 30 and the operating member 10 engage from the axial direction, and hence the movement of the reclining lever 30 in the axial direction can be regulated and the attaching can stably be performed.

In addition, the arm portion 14 has the input surface portion 16 which comes in contact with the output surface portion 42. The input surface portion 16 is interposed between the fitting portion 38 and the holding region 34 of the reclining lever 30, and hence the reclining lever 30 does not have to be enlarged more than necessary and can be made compact.

Additionally, the reclining lever 30 has the cap 50 detachably attached from an outside of the reclining lever in the axial direction. In addition, the pawl portion 18 and the engaging pawl 54 (the engaging structure) are interposed between the cap 50 and the arm portion 14. In consequence, an operability in attaching and detaching the reclining lever 30 can improve.

The embodiment of the present invention has been described above, but the vehicle seat of the present invention is not limited to the embodiment but can be implemented in various configurations. For example, in the present embodiment, the reclining mechanism is illustrated as an operating seat mechanism disposed in the seat, but the present invention is not limited to the embodiment. In a configuration of the present embodiment, a lifter mechanism, a tilt mechanism or the like is suitably applicable as the operating seat mechanism, and various components are applicable as the pivoting operation lever to this operating member. In addition, when the reclining lever (the pivoting operation lever) and the operating member are attached in the axial direction, an employable method is not limited to the engaging structure, and any fixing method can be employed. In addition, the distal end of the arm portion is constituted of the input surface portion and the engaging structure, but the present invention is not limited to this embodiment. That is, in the arm portion, the input surface portion may be disposed separately from the engaging structure. In addition, the input surface portion does not have to be interposed between the fitting portion and the holding region of the pivoting operation lever. The coupling region of the reclining lever (the pivoting operation lever) does not have to have the cap. That is, the coupling region may have a constitution where the main body portion is integrated with the cap. In the constitution where the reclining lever does not have the cap (the constitution where the main body portion is integrated with the cap), the coupling region may be constituted of the engaging structure which engages with the arm portion. In addition, the engaging structure may have a configuration where portions each shaped in the form of a hook engage with each other in the axial direction, or a configuration where one of the arm portion and the coupling region is shaped in the form of a concave portion, a hole portion or the like to receive a pawl shaped region.

In addition, the seat for the automobile has been illustrated as the vehicle seat in the above embodiment, but the present invention is not limited to this embodiment. The vehicle seat of the present invention is applicable to various vehicles such as the automobile, a truck, a bus, a train, an aircraft, a boat, a vessel, and a submarine.

What is claimed is:

1. A vehicle seat comprising:
   a seat;
   an operating member that operates an operating seat mechanism disposed in the seat; and
   a pivoting operation lever coupled to the operating member that is configured to exert a pivoting operation force to cause the operating member to operate the operating seat mechanism, wherein
   the operating member is defined by a shaft portion which rotates around an axis to operate the operating seat mechanism, and an arm portion that is integrally connected to the shaft portion, the arm portion extends from a rotation center of the shaft portion outwardly in a radial direction,
   the pivoting operation lever includes a holding region disposed outwardly from the rotation center of the shaft portion in the radial direction to exert the pivoting operation force on the operating member, and a coupling region that transmits the pivoting operation force to the operating member, the coupling region includes:
     a fitting portion which fits on the shaft portion from an axial direction such that the fitting portion transmits the pivoting operation force to the operating member, and
     an output surface portion which comes in contact with the arm portion in a pivoting direction of the arm portion such that the output surface portion transmits the pivoting operation force to the operating member.

2. The vehicle seat according to claim 1,
   wherein the pivoting operation lever and the operating member are engaged with each other in the axial direction by an engaging structure provided between the arm portion and the coupling region.

3. The vehicle seat according to claim 2,
   wherein the arm portion has an input surface portion which comes in contact with the output surface portion, and the input surface portion is interposed between the fitting portion and the holding region of the pivoting operation lever.

4. The vehicle seat according to claim 3,
   wherein the input surface portion faces in a pivoting direction of the operating member.

5. The vehicle seat according to claim 2,
   wherein the pivoting operation lever has a cap which is detachably attached from an outside of the pivoting operation lever in the axial direction, and
   the engaging structure is interposed between the cap and the arm portion.

6. The vehicle seat according to claim 5, wherein an engaging pawl of the engaging structure extends from the cap and engages with a pawl portion of an input surface portion that extends from the arm portion.

7. The vehicle seat according to claim 6, wherein the input surface portion comes in contact with the output surface portion, and the input surface portion is interposed between the fitting portion and the holding region of the pivoting operation lever.

8. The vehicle seat according to claim 1, wherein the coupling region of the pivoting operation lever further includes a through hole spaced from a center of the coupling region and located adjacent to the output surface portion, the through hole extending through the pivoting operation lever, and
   the pivoting operation lever and the operating member are engaged with each other in the axial direction by an engaging structure that extends through the thorough hole from an outside of the through hole and engages the arm portion.

* * * * *